(12) United States Patent
Weimer et al.

(10) Patent No.: US 6,373,205 B1
(45) Date of Patent: Apr. 16, 2002

(54) VIBRATION DAMPING SYSTEM

(75) Inventors: Jürgen Weimer, Euerbach; Bernd Peinemann, Niederwerrn; Cora Carlson, Hambach; Jürgen Weth, Niederwerrn, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/533,524

(22) Filed: Mar. 23, 2000

(30) Foreign Application Priority Data

Mar. 23, 1999 (DE) .......................... 199 13 015

(51) Int. Cl.$^7$ .......................... H02K 5/24; F16F 15/10
(52) U.S. Cl. ...................... 318/114; 123/192.1; 74/574
(58) Field of Search ............................ 318/114; 310/51; 123/192.1; 74/574

(56) References Cited

U.S. PATENT DOCUMENTS

| | | | |
|---|---|---|---|
| 2,317,983 A | | 5/1943 | Fisher .......................... 74/604 |
| 2,361,710 A | | 10/1944 | Salomon ...................... 74/574 |
| 5,080,204 A | * | 1/1992 | Bauer et al. ................. 188/129 |
| 5,185,543 A | * | 2/1993 | Tebbe .......................... 310/51 |
| 5,751,202 A | | 5/1998 | Seino .......................... 335/296 |
| 6,234,045 B1 | * | 5/2001 | Kaiser ....................... 74/574 |

FOREIGN PATENT DOCUMENTS

| | | | |
|---|---|---|---|
| DE | 32 28 738 | 4/1983 | ............. F16D/3/80 |
| DE | 33 22 368 | 1/1985 | ............. F16G/3/14 |
| DE | 38 39 436 | 5/1990 | ............. F16F/15/12 |
| DE | 43 28 927 | 3/1994 | ............. F16F/15/30 |
| DE | 44 26 317 | 2/1995 | ............. F16F/15/30 |
| DE | 44 23 577 | 8/1995 | ............. F16F/15/18 |
| DE | 195 32 129 | 3/1997 | ............. F16F/15/18 |
| DE | 195 44 832 | 6/1997 | ............. F16D/3/68 |
| JP | 10-115342 A | * 5/1998 | |

* cited by examiner

Primary Examiner—Nestor Ramirez
Assistant Examiner—Judson H. Jones
(74) Attorney, Agent, or Firm—Cohen, Pontani, Lieberman & Pavane

(57) ABSTRACT

A vibration damping system for a drive system of a motor vehicle includes an electric machine controllable by a control device for exerting a counter-torque on a rotating constructional group. A deflection mass arrangement is arranged at the rotating constructional group having at least one deflection mass and a deflection path associated with the at least one deflection mass and along which the deflection mass can move. The deflection path associated with the at least one deflection mass has a vertex area and deflection areas proceeding from the vertex area. The vertex area is an area with the greatest radial distance of the deflection path from an axis of rotation of the rotating constructional group.

22 Claims, 8 Drawing Sheets

VIBRATION DAMPING SYSTEM

BACKGROUND OF THE INVENTION

1. Field of the Invention

The present invention is directed to a vibration damping system for a motor vehicle drive system of a motor vehicle which includes an electric machine controllable by a control device for exerting a counter-torque on a rotating constructional group.

2. Description of the Related Art

A vibration damping system is disclosed in German reference DE 195 32 129 A1 in which movement irregularities of a shaft may be actively reduced by appropriately controlling an electric machine. The electric machine receives information from a control device including indications of the occurrence of movement irregularities. The information regarding the movement irregularities may be indicated in secondary quantities such, for example, as the rotational speed of the machine, the throttle position, or other parameters related to the rotational speed of the machine. The occurrence of movement irregularities is compulsorily expected in certain operating states. A control variable for the electric machine is taken from a characteristic field corresponding to the respective operating state and the electric machine is then operated to generate a counter-torque to the movement irregularities expected at the respective operating state. It is also possible to detect occurring movement irregularities directly and to minimize them correspondingly in a regulating process.

The electric machine used in this known system may simultaneously provide a supporting force for an internal combustion engine or act as a generator of electric energy so that electric energy is also generated during the vibration damping function to feed consumers present in the vehicle—i.e., lights, radio—or to charge a battery.

This system inherently includes a number of problems. During relatively strong vibrations having large amplitudes, there is the risk that the energy required by the electric machine for damping these strong vibrations is so great that a suitable supply of energy from the electric machine to electric consumers in a vehicle is no longer ensured during the vibration damping function. Further, a characteristic of electric machines is that the torque decreases as the speed increases. Accordingly, movement irregularities occurring chiefly at high speeds may not be suitably damped. To counter these two problems, the electric machines in known systems must be dimensioned so that they are large enough to guarantee a sufficient vibration damping function at high rotational speed and a sufficient supply of electric energy to the consumers during strong vibrations. Further, the overall efficiency of the drivetrain is reduced by the active vibration damping—especially during the operating states of the drive system requiring counter-torque generation—thereby increasing the fuel consumption of the internal combustion engine.

SUMMARY OF THE INVENTION

The object of the present invention is to provide a vibration damping system for generating suitable vibration damping in a simple and economical construction essentially independent from the operating state while simultaneously achieving a high efficiency of torque transmission and a low energy consumption of the driving source.

According to the invention, this object is met by a vibration damping system for a drive system of a motor vehicle comprising an electric machine controllable by a control device for exerting a counter-torque on a rotating constructional group.

The inventive vibration damping system further comprises a deflection mass arrangement in a rotating constructional group of the drive system that is rotatable about an axis of rotation. The deflection mass arrangement has at least one deflection mass and a deflection path associated with the at least one deflection mass and along which the at least one deflection mass is movable. The deflection path associated with the at least one deflection mass has a vertex area which is an area with the greatest radial distance of the deflection path from the axis of rotation of the rotating constructional group and deflection areas proceeding from the vertex area.

The vibration damping system according to the invention includes two systems for countering occurring movement irregularities. The first system for countering movement irregularities is the electric machine which may provide a high counter-torque especially in the low speed range and accordingly ensures suitable vibration damping. The second system for countering movement irregularities is the deflection mass arrangement which may exercise its vibration damping action or vibration eliminating action especially when the deflection masses excited to oscillation are deflected from a sufficiently strong centrifugal potential. This latter situation ultimately requires a sufficiently high rotational speed of the rotating constructional group. The two systems supplement one another. Moreover, the energy to be applied by the electric machine for vibration damping may be reduced even at low rotational speeds by the counter-torque provided by the deflection mass arrangement. Accordingly, the deflection mass arrangement according to the invention provides a vibration damping or vibration eliminating function even at low rotational speed—i.e., with low centrifugal force. Due to the weaker centrifugal potential at lower rotational speeds, the risk that the deflection masses will reach the respective end areas of their deflection paths and will strike against the ends of their deflection paths is heightened. The striking would lead, in principle, to a detuning of these oscillators. However, the electric machine may be used to generate a counter-torque to an occurring vibrational excitation in the area of operation in which the striking of the deflection masses is anticipated. This may be achieved to an extent such that, while not entirely eliminating the induced vibrations already by the action of the electric machine, these vibrations are nevertheless weakened to the extent that the movement irregularities which still remain and which act on the deflection mass arrangement no longer cause the deflection masses to strike against their path ends. Therefore, the electric machine is operated only to the extent that is required to keep the deflection mass arrangement within its normal operating range, i.e., in an operating range in which the associated deflection masses cannot strike against their path ends at respective stop areas. In this way, the energy to be applied by the electric machine for damping vibrations may be minimized in the low-speed range which allows the use of smaller electric machines and allows the electric machine to provide sufficient electric energy for additional consumers, if required, in this operating range. The overall effect is that energy consumption is reduced.

The control device of the present invention, for example, may be arranged for receiving information about movement irregularities that are anticipated or that occur during rotation of the constructional group and controlling the electric machine so that the counter-torque exerted by the electric machine counters the anticipated or occurring movement irregularities. The information about movement irregularities may be derived directly from movement irregularities detected in the system as well as indirectly from the operating point of the internal combustion engine. The operating point of the internal combustion engine may, for example, be derived from the rotational speed, the throttle opening, and/or the intake pipe pressure of an internal combustion engine. It is well-known that movement irregularities occur in a compulsory manner in certain operating states that are defined by such quantities.

As mentioned above, the control device may be arranged for controlling the electric machine for generating a counter-torque for eliminating movement irregularities only in a range of low rotational speed such as less than 1800 revolutions/minute or, at most, less than 1000 revolutions/minute because the torque output of an electric machine decreases as the rotating speed increases.

However, beyond this, the control device may also control the electric machine for generating the counter-torque for predetermined frequencies, predetermined frequency ranges, and/or a predetermined type of movement irregularity independent from the rotational speed of the rotating constructional group. While it is taken into account that, in principle, the efficiency of the electric machine at higher speeds is reduced, the electric machine may be used at higher speeds in an attempt to counter vibrational excitations which would excessively impair the driving comfort or the driving behavior of a vehicle using all available means.

Further, the electric machine preferably generates a basic braking torque or driving torque for supplying the onboard power supply. The generation of the counter-torque is superimposed on the generation of the basic braking torque or driving torque when movement irregularities occur.

The deflection path of the at least one deflection mass has deflection areas that may extend in opposing axial directions proceeding from the vertex area and/or the deflection areas may extend in opposing circumferential directions proceeding from the vertex area.

The vibration damping system according to the invention may be constructed so that the electric machine comprises a rotor which rotates with the rotating constructional group and a stator which does not rotate with the rotating constructional group and which can be made to interact with the rotor so as to transmit counter-torque.

The electric machine may, for example, comprise a synchronous motor, an asynchronous motor or a reluctance motor.

The deflection mass arrangement may be arranged at least partially radially inside the electric machine and the deflection mass arrangement and electric machine may overlap in the axial direction at least in some areas. Of course, the deflection mass arrangement may also be arranged at least partially outside of the electric machine.

The stator of the electric machine may be arranged radially between a rotor of the electric machine and the deflection mass arrangement. Alternatively, the stator of the electric machine may be arranged radially outside of a rotor and the deflection mass arrangement. The dimensioning of the deflection paths and/or deflection masses may be carried out essentially independent from the construction of the electric machine when the electric machine and the deflection mass arrangement are arranged in axial succession.

As stated above, the electric machine is preferably controlled by the control device for partial elimination of movement irregularities, so that a remaining portion of the movement irregularities may be damped or eliminated by the deflection mass arrangement.

The present invention is further directed to a drive system comprising a drive unit and a vibration damping system according to the present invention.

When the drive unit is an internal combustion engine, the electric machine for generating counter-torque may also function as a starter arrangement for the internal combustion engine. Further, as was already mentioned, the electric machine may simultaneously function as a generator arrangement by which electric energy is provided for supplying electric energy consumers or for charging a battery.

For example, the deflection mass arrangement may be fixed in an area of the rotating constructional group fixedly connected with respect to rotation with the drive unit of the drive system. Alternatively, the deflection mass arrangement may be arranged in an area of a flywheel of a friction clutch of the drive system.

The present invention is further directed to a method for vibration damping in a drive system defined above, wherein the method comprises the following steps:
a) detecting information which indicates the occurrence of movement irregularities; and
b) controlling the electric machine for generating a counter-torque opposing the indicated movement irregularities.

In this method, the information indicating the occurrence of movement irregularities comprises at least one of the following quantities:
  rotational speed of the drive unit;
  temperature of the coolant of the drive unit;
  position of at least one power output or actuating element of the drive unit;
  output delivered by the drive unit; and
  change in speed in the area of the rotating constructional group.

To counter occurring movement irregularities in a suitable manner, step b) may include generating a reference value for the counter-torque to be generated by the electric machine or a quantity in a relation to the counter-torque and adjusting an actual value of the counter-torque generated by the electric machine or the quantity related to the counter-torque to the reference value.

As was already mentioned above, the electric machine may be controlled to generate a counter-torque that essentially only reduces occurring movement irregularities so that the remaining part of the movement irregularities are damped or eliminated by the deflection mass arrangement.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
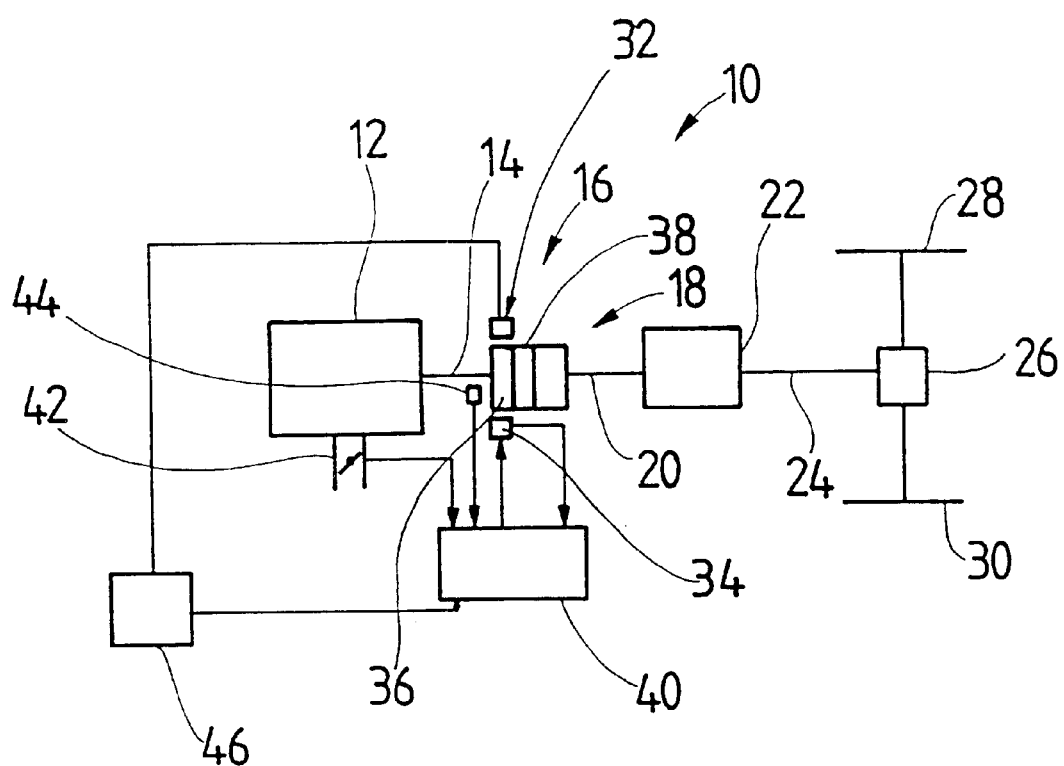
FIG. 1 is a schematic view of a drive system with a vibration damping system according to the present invention.

FIG. 1 is a block diagram of a drive system 10 for a motor vehicle according to the present invention comprising a drive unit 12 such as, for example, an internal combustion engine, with an output shaft 14 that is coupled with a vibration damping system 16. A friction clutch 18 is rotatably connected with the vibration damping system 16. An output shaft, i.e., a transmission input shaft 20, of the friction clutch 18 leads to a transmission 22 having a transmission output shaft 24 coupled with drive wheels 28, 30 via a differential 26. The vibration damping system 16, which will be described in more detail below, comprises an electric machine 32 with a stationary stator 34 and a rotor 36 which is rotatable with the different shafts of the drive system 10. The vibration damping system 16 also comprises a deflection mass arrangement 38 which will also be described in more detail below.

A control device 40 receives signals representing different parameters or quantities characterizing the operating state of the drive system 10. For example, the control device 40 may receive information about the opening angle of a choke 42 and information about the rotational speed of the drive shaft 14, i.e., the speed of the internal combustion engine 12 via a sensor 44. The control device 40 may also receive information about the electric current flowing in the stator 34. The control device 40 also receives a large amount of additional information for suitable control of the operation of the drive system 10 and especially for control of the vibration damping system 16. For instance, when the electric machine 32 comprises a generator, some of this information received by the control device 40 may concern the amount of electric power instantaneously demanded by all consumers 46 of electric power arranged in a vehicle. Therefore, suitable electric power may be provided by appropriate control of the electric machine 32. Of course, the electric machine 32 may also be used as a starter for starting the internal combustion engine 12 or to generate booster or support power when the demand for power exceeds the capabilities of the internal combustion engine 12 such as, for example, when climbing a steep hill.

When irregularities occur in movement or rotation during the operation of the drive system 10, the control device 40 controls the electric machine 32—which may, for example, comprise a synchronous motor, asynchronous motor or reluctance motor—to actively counter these movement irregularities or rotational irregularities. On the basis of information regarding the operating state of the motor vehicle such as, for example, the throttle valve opening, rotational speed of the internal combustion engine, coolant temperature, and so on, the control device 40 may determine the quantity of a current flowing across the windings of the stator 34 required to generate a suitable counter-torque by the electric machine 32, i.e. by the electromagnetic interaction between the stator 34 and the rotor 36. The control device 40 may determine the required quantity of current from a field of characteristics formed on the basis of the operating state. In addition to the amplitude and frequency of this current 34 flowing across the stator windings, the phase position of this current , i.e., the amplitude maxima, with respect to a rotational position of the drive shaft 14 may also be read from another characteristic field based on the same input quantities, so that the current flowing through the stator windings may be correlated with respect to time with the expected or occurring vibrational excitation based on the rotational position of a crank shaft 14 which may, for example, be detected by the sensor 44.

By determining the required stator currents from a characteristic field generated beforehand on the basis of tests for the drive system 10 or from a plurality of characteristic fields, a control of the vibration damping system is effected which incorporates an internal regulation of the current flowing through the stator windings 34 in the electric machine 32. Accordingly, a reference value is generated for the alternating current opposing the rotational irregularities or movement irregularities based on the characteristic field or characteristic fields in the control device 40. The current flowing across the stator windings 34 is then adjusted to the reference value by the control device 40. Furthermore, a control loop may nevertheless also be provided with respect to the actually occurring movement irregularities. The optional control loop may make conclusions about actually occurring instantaneous torsional vibrations through derivation of the speed signal provided by, for example, the speed sensor 44 thereby allowing the control device 40 to control the current flowing through the stator 34 so that the actually detected rotational irregularities are regulated to a minimum.

The control device 40 may add a current component to the stator current associated with this counter-torque so that the different consumers 46 in a vehicle are then ultimately supplied by this current component. Therefore, during a vibration damping operation, the current required for countering vibrations is superimposed on the current associated with a normal generator operation of the electric machine 32.

In addition to the control device 40 and electric machine 32, the vibration damping system 16 according to the invention further comprises the deflection mass arrangement 38 which is now described in more detail. The deflection mass arrangement 38 has at least one deflection mass which deflects in the centrifugal potential in the manner of an oscillator when rotational irregularities occur. The deflection mass accordingly builds up an oscillation which is in opposite phase to and which opposes the exciting vibration. Accordingly, the vibration damping system 16 is divided into a part that damps by electromagnetic interaction and a part that damps by mass oscillation. As a result of this division of the vibration damping system 16, a particularly advantageous synergistic effect is achieved in vibration damping. To achieve a suitable vibration damping function by the above-mentioned deflection mass arrangement, an appropriate ratio of centrifugal force to deflecting force must be determined. If the centrifugal force is too small for a given deflecting force, the returning force or restoring force of the oscillating masses is too small and the masses consequently abut at stops in the area of their path ends which may result in a detuning of the oscillators. In general, this condition is to be expected in a low-speed operating state because at low rotational speeds—in the range of less than 1800 revolutions per minute and especially in the range of idling speed of less than 1000 revolutions per minute— the occurring rotational irregularities may be massive relative to the centrifugal forces. However, the electric machine 32 may be used to generate a torque opposing the occurring vibrations in this low-speed region with a particularly high efficiency. Therefore, the occurring vibrations are reduced by this torque generated by the electric machine 32 to the extent that the rotational irregularities or movement irregularities existing in the drive system are no longer sufficient with respect to the amplitudes still present to move the oscillating masses of the deflection mass arrangement 38 up to the path ends—the maximum deflection from the rest position. Accordingly, the electric machine 32 and the deflection mass arrangement 38 may be adapted for every rotational speed or for every speed range such that the electric machine 32 is active only to the extent that the remaining vibration amplitudes may be eliminated or damped by the deflection mass arrangement 38 without the risk of the oscillating masses striking respective path end areas. The combination of the deflection mass arrangement 38 with the electric machine 32 in the vibration damping system 16 minimizes the requirements of the electric machine 32 for vibration damping. Therefore, the electric machine 32 may be dimensioned smaller than an electric machine that is not designed to be used with a deflection mass arrangement 38 while still ensuring that the electric consumers 46 present in the vehicle continue to be suitably supplied with energy in all operating states. However, it is noted that when the electric consumers 46 do not have a very high energy requirement, the electric machine 32 may be used to a greater extent for vibration damping, up to and including its entire output capability.

Further, the vibration damping system 10 of the type mentioned above may be operated such that the electric machine 32 is also used for vibration damping at high rotational speeds in spite of the drop in available countertorque of the electric machine 32 as the rotational speed increases. This operation may be effected when very strong vibrational excitations are expected due to determined operating states that cannot be damped or cannot be completely damped by the deflection mass arrangement alone. Therefore, non-cyclical vibrational excitations, especially in the higher speed range, may also be damped by the electric machine 32. During alternating load vibrations or when shifting is carried out with temporary load interruptions, the electric machine 32 may also be used for vibration damping at higher rotational speeds because in these states vibrational excitations may occur at frequencies to which the deflection mass arrangement 38 is not adapted. When operating states indicating the occurrence of relatively strong vibrational excitation are not present at higher rotational speeds, the electric machine 32 may then be operated only for generating electric energy for the consumers 46, thereby minimizing the time during which the electric machine is used for vibration damping at higher speeds and consequently during which it may not be able to provide the required energy and accordingly feed the consumers 46.

Figure 9:
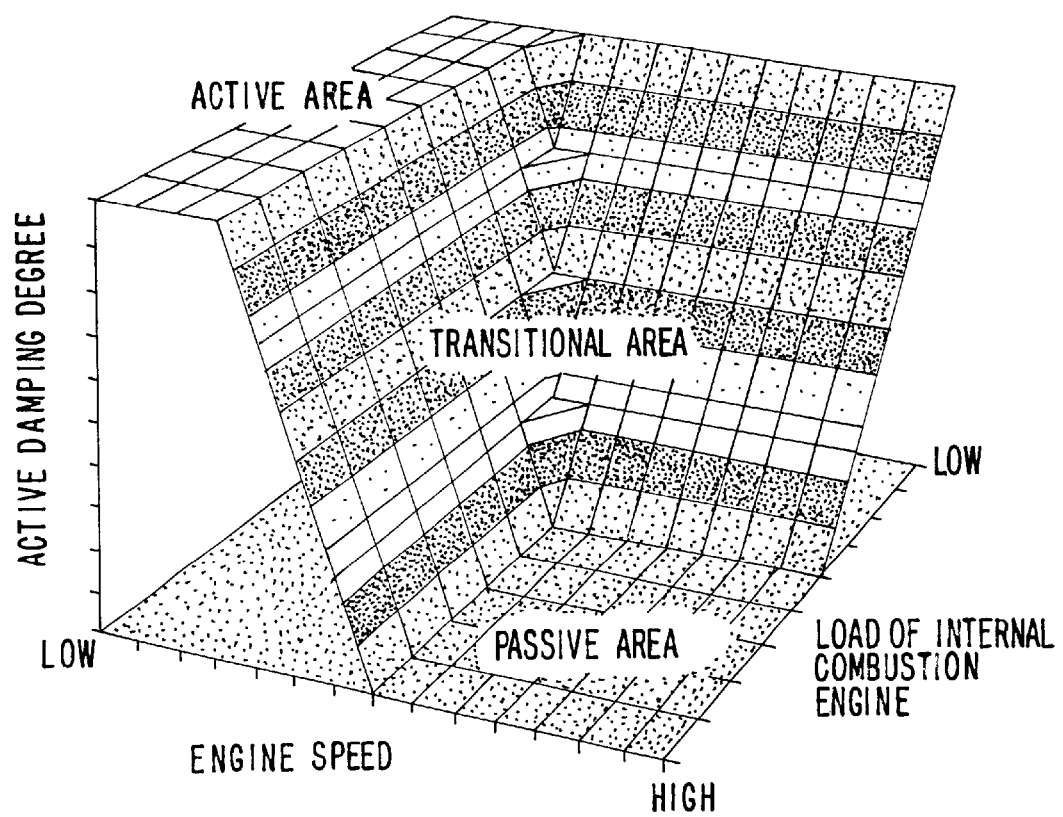
FIG. 9 shows a diagram showing the active damping degree of a vibration damping device according to the present invention plotted against a characteristic field including engine speed and load of an internal combustion engine.

Referring to the diagram in FIG. 9, the working characteristic of the vibration damping system 16 may be essentially divided into three areas during the operation of a drive system 10 shown in FIG. 1. The first area is an "active area" of low rotational speed or low engine load shown in the action diagram in FIG. 9, wherein the centrifugal force is so low that an effective operation of the deflection mass arrangement 38 is not expected and the vibration damping is therefore actively carried out essentially only through corresponding control of the electric machine 32. This area is followed by a transitional area in which the occurring rotational irregularities or movement irregularities may be reduced through a pre-damping by the electric machine 32 to the extent that any remaining exciting vibrations may be damped by the deflection mass arrangement 38 without the deflection masses reaching their end positions. At even higher rotational speeds, the vibration damping system 16 enters a passive area in which, due to the relatively high rotational speed, the efficiency of the electric machine 32 is so low that the vibration damping is effected exclusively by the deflection mass arrangement 38 to ensure the continued supply of electric energy to the consumers 46 by the electric machine 32. Nevertheless, as was already mentioned, in extraordinary situations such as occur with alternating load vibrations or when carrying out shifting processes, the electric machine 32 may be temporarily switched on in this passive area for damping vibrations, wherein the consumers 46 are supplied by the battery during this period.

The basic construction and action of a vibration damping system 16 and drive system 10 according to the invention have been described above. In the following, the construction of different embodiments of vibration damping systems according to the invention will be described with reference to FIGS. 2 to 8.

Figure 2:
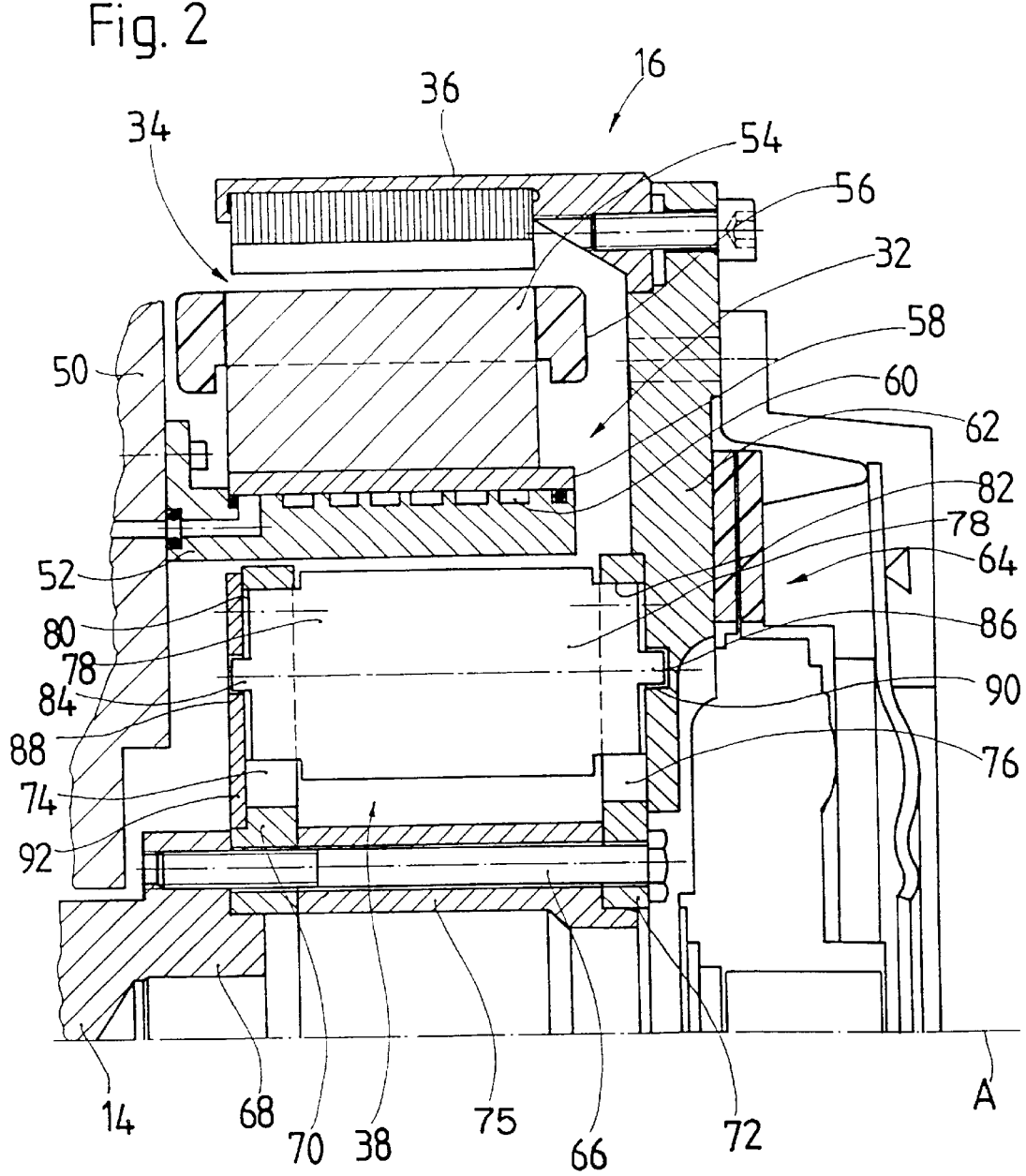
FIG. 2 is a partial longitudinal sectional view of a vibration damping system according to an embodiment of the present invention.

FIG. 2 shows a vibration damping system 16 according to the present invention in which the electric machine 32 comprises a synchronous machine having a stator 34 and a rotor 36. The stator 34 is fastened to an engine block 50 of an internal combustion engine and has, for example, an annular carrier 52 supporting the stator yoke 54 with the stator windings 56. The annular carrier 52 includes a duct system 60 which is closed by a cover ring 58. The duct system 60 is supplied with coolant via a connection at the engine block 60. The radial outer side of the rotor 36 of the electric machine 32 is supported at a flywheel 62 of a motor vehicle friction clutch 64 which is shown schematically. The radial inner area of the flywheel 62 is secured by a plurality of screw bolts 66 to a crankshaft flange 68 of a crankshaft 14 functioning as a drive shaft in the internal combustion engine 12 (FIG. 1) such that the flywheel 62 is fixed with respect to rotation relative to the crankshaft flange 68. The deflection mass arrangement 38 is arranged in an area located on the radial inside of the electric machine 32, i.e., radially inside the annular carrier 52 of the stator 34 axially between the engine housing or engine block 50 and the flywheel 62 of the friction clutch 64.

The deflection mass arrangement 38 comprises two path elements 70, 72 arranged at an axial distance from each other and which are fixedly coupled with the crankshaft 14, likewise by the screws 66, with the intermediary of a spacer ring 75. The path elements 70, 72 have a plurality of deflection paths 74, 76 which are arranged successively in the circumferential direction and are formed, for example, by individual openings along which associated deflection masses 78 are movably arranged. The deflection paths 74, 76 associated with a deflection mass 78 are configured so that each of the deflection paths 74, 76 has a respective vertex area 80, 82 at an area of the deflection paths that is the greatest radial distance from an axis of rotation A of the drive system 10. Proceeding from the vertex area 80 or 82 in both circumferential directions, each of the deflection paths has deflection areas which approach progressively nearer to the axis of rotation A as the distance from the vertex area 80, 82 increases. During the movement of the deflection masses 78 along the associated deflection paths 74, 76, these deflection masses 78 progressively approach the axis of rotation A with increasing distance from the vertex areas 80, 82, so that a restoring force is generated in the centrifugal potential toward the rest position of the deflection masses 78 defined by the vertex areas 80, 82. To obtain a natural frequency of the oscillators which are generated in this manner so that the natural frequency is essentially independent from the deflection amplitude of the respective deflection masses 78, the deflection paths 70, 76 comprise an essentially epicycloidal path configuration with the vertex areas 80, 82 forming the area of the least path curvature. Since the deflection paths have an epicycloidal path configuration, the mass centers of gravity of the deflection masses moving along the deflection paths move on epicycloidal paths. Ultimately, this means that the deflection paths must be adapted to the epicycloidal shape to achieve such movement shapes of the mass centers of gravity.

The deflection masses 78 have guide projections 84, 86 projecting from their two axial end sides. The guide projections 84, 86 are guided in associated guide paths 88, 90 respectively arranged in a guide element 92 which is fixedly connected with the path element 70 and the flywheel 62 with a slight movement play in the radial direction. The guide paths 88, 90 are formed by openings or recesses that exactly follow the course of the deflection paths 74, 76 and form an end stop for the deflection masses 78 at their respective circumferential end areas. As discussed above, when the strength of the exciting vibration is such that the deflection masses 78 are at a relatively great distance from their rest position defined by the vertex areas 80, 82, the end areas of the guide paths 88, 90 limit the movement of the deflection masses 78 by acting as stops for the guide projections 84, 86 at the end areas. The guide paths 88, 90 also hold the deflection masses 78 in a suitable position with respect to their deflection paths 74, 76 even when no centrifugal force is present. That is, the deflection masses 78 are prevented from moving downward due to gravitational force and from lying in a more or less undefined position with respect to the path elements 70, 72 without contact with their deflection paths 74, 76 when the deflection mass arrangement 38 is not rotating. If the system were set in rotation from such a state, the deflection masses 78 would move outward spontaneously given sufficient centrifugal force and would strike against their respective deflection paths 74, 76.

Due to the positioning of the deflection mass arrangement 38 on the radial inner side of the electric machine 32, sufficient centrifugal forces are obtained in the system shown in FIG. 2 by providing relatively large axial dimensions of the deflection masses 78 with a relatively short distance of the deflection paths 74, 76 from the axis of rotation A.

It is noted that the two path elements 70, 72 and the guide element 92 may be formed by stamping out of sheet metal.

A particular advantage of this embodiment is that the entire required installation space may be kept very small because of the positioning of the deflection mass arrangement 38 inside the space enclosed by the electric machine 32.

Figure 3:
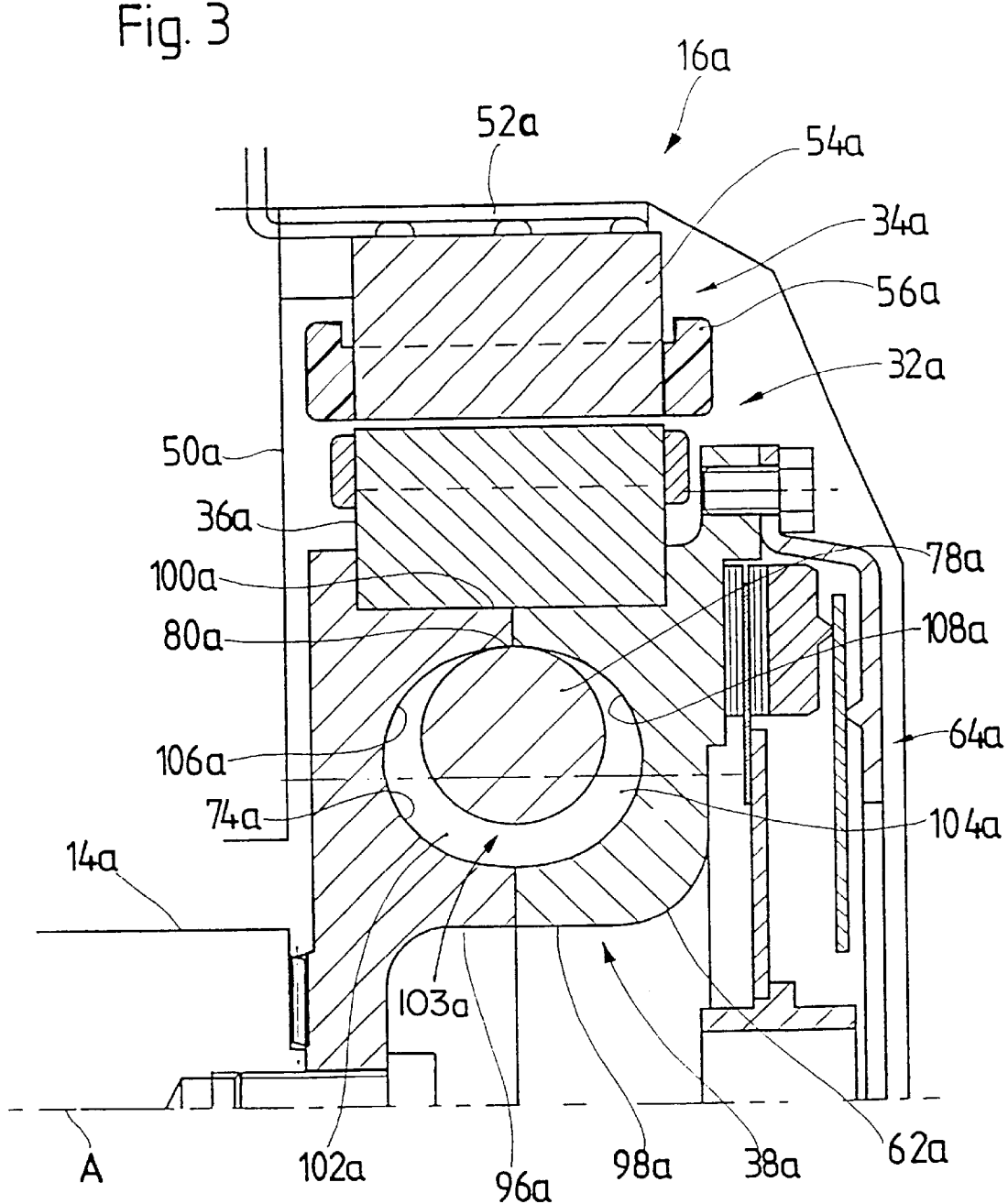
FIG. 3 is a view corresponding to FIG. 2 of an alternative embodiment of a vibration damping system according to the invention.

Another embodiment of the present invention is shown in FIG. 3. Components which correspond to those described above with respect to construction and operation are designated by the same reference numbers with a suffix "a". The vibration damping system 16a according to this embodiment comprises an electric machine 32a constructed as an asynchronous motor. The stator 34a of the electric machine 32a is positioned radially outside of the rotor 36a and is held at the engine block 50a by an annular carrier 52a. The rotor 36a is secured to the outer circumference of the flywheel 62a and is located so that it radially opposes the inner circumferential surface of the stator 34a. The flywheel 62a in this embodiment comprises two parts including a first disk part 96a and a second disk part 98a. The first disk part 96a is connected with the crankshaft 14a and the second disk part 98a is connected with the first disk part 96a, for example, by screw bolts which are not shown. A circumferential depression 100a is formed in the radial outer area of the two disk parts 96a, 98a in which the rotor 36a is secured. The two disk parts 96a, 98a also have a plurality of recesses or depressions 102a, 104a which are associated with one another, and which together form a receptacle space 103a for a deflection mass 78a. The radial outer side of the receptacle space 103a is limited by a surface which forms a deflection path 74a. FIG. 3 shows the vertex area 80a and the two deflection areas 106a, 108a of the deflection path 74a. The deflection areas 106a, 108a do not extend in the circumferential direction in this case, as was described above. Rather, the deflection areas 106a, 108a extend axially in the direction of the axis of rotation A proceeding from the vertex area 80a. Correspondingly, the deflection mass 78a deflects in the axial direction, not the circumferential direction. The deflection path 74a of every deflection mass 78a preferably again has an epicycloidal shape. The deflection mass 78a may, for example, comprise a spherical or disk-shaped deflection mass. The walls defining the circumferential sides of the recesses 104a, 102a ensure that the deflection mass 78a does not tilt to one side when the deflection mass 78a comprises a disk-shaped structural component part.

In this embodiment, the deflection mass 78a oscillates in the direction of the axis of rotation to damp wobbling oscillations which occur during operation and which essentially have a frequency of the first order of the crankshaft rotational speed. These types of oscillations occur when a slight axial offset or a slight axial inclination originates or exists between the crankshaft 14a and a transmission input shaft 20 (see FIG. 1), thereby causing an axial deflection in the area of the flywheel 62a and clutch disk. These axial vibrations or deflections may be damped by deflection masses 78a in opposite phase which oscillate in the axial direction or along the deflection paths 74a.

However, the embodiment of FIG. 3 is not limited to the damping of wobbling oscillations. Torsional vibrations occurring in the circumferential direction may also be damped in that the deflection paths 74a may have deflection path areas proceeding from the vertex area 80a in the circumferential direction in addition to the deflection path portions 106a, 108a extending in the axial direction. That is, a three-dimensionally curved deflection path surface may be created in which a spherical deflection mass may ultimately be deflected in any direction. For example, when wobbling oscillations and torsional vibrations occur in superposition, the individual deflection masses 78a may run through an approximately circular path around the vertex area 80a.

The damping of wobbling oscillations in the area of the deflection mass arrangement 38a facilitates the maintenance of a virtually constant air gap between the stator 34a and the rotor 36a. The size of this air gap is an extremely important quantity for the performance of the electric machine 32a because a variation in the air gap causes a corresponding variation in the counter-torque transmission capability and, consequently, a corresponding variation in the capability of generating electric energy or producing a counter-torque. Therefore, if the air gap had to be enlarged to prevent mutual striking during wobbling oscillations, a corresponding overdimensioning would also have to be applied in the other areas of the electric machine 32a. This overdimensioning requirement may be avoided by a deflection mass arrangement 38a constructed in the manner described above.

It is noted that the connection between the first disk part 96a of the flywheel 62a and the drive shaft 14a such that they are fixed with respect to relative rotation can be accomplished via a Hirth toothing which is shown in FIG. 3.

Figure 4:
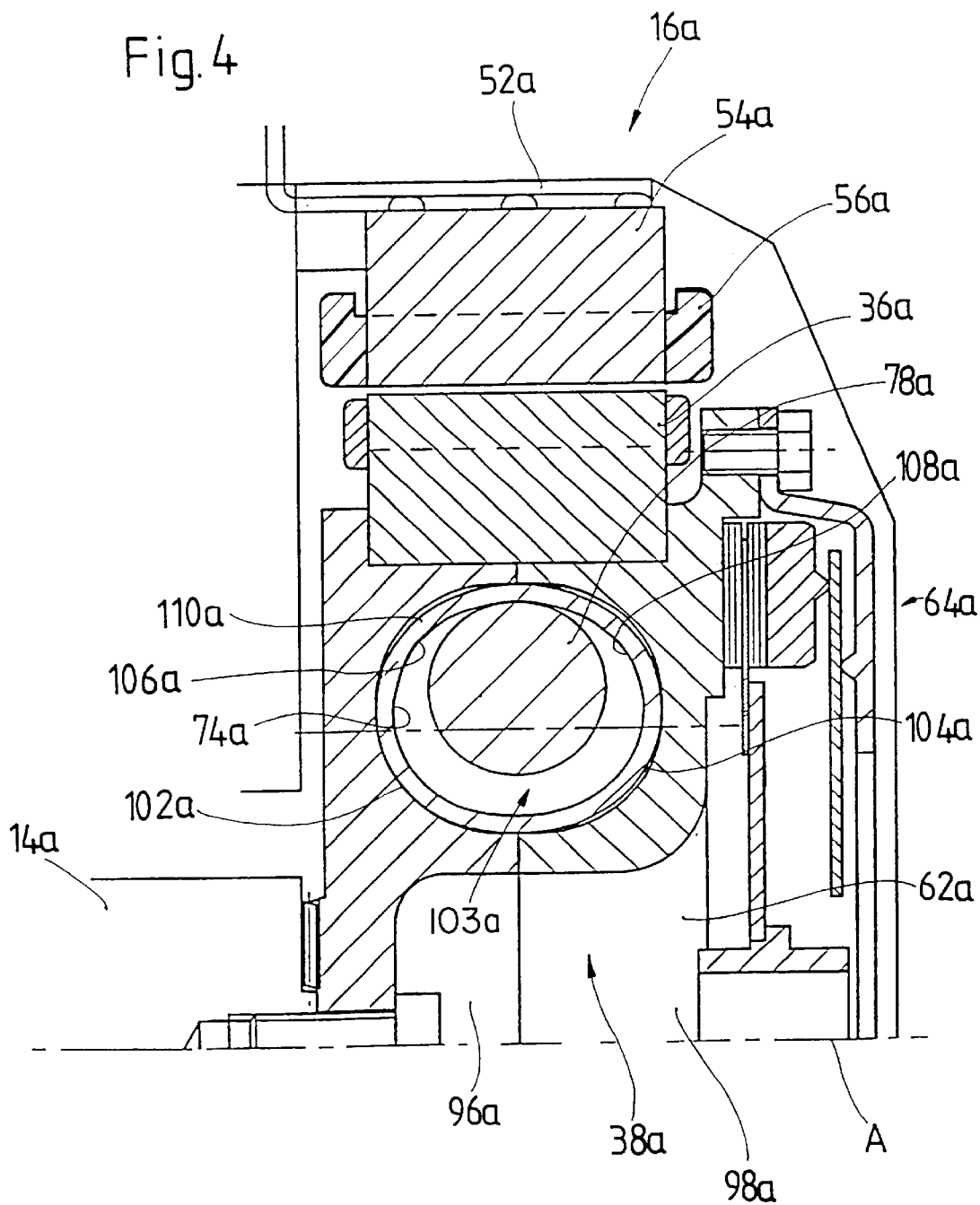
FIG. 4 is a view corresponding to FIG. 3 of a modification of the embodiment of the vibration damping system shown in FIG. 3.

The embodiment form shown in FIG. 4 essentially corresponds to the embodiment form shown in FIG. 3 with the addition of an annular element 110a having an inner circumferential surface forming the deflection path 74a for the deflection mass 78a. The annular element 110a is inserted in the receptacle space 103a formed by recesses 102a, 104a. The advantage of this embodiment form is that during formation of the recesses 102a, 104a the exact configuration of the deflection paths 74a is not required to be treated with great precision. Rather, the exact path geometry is produced by deep drawing the annular part 110a from a sheet metal blank. This embodiment is particularly suitable in a deflection mass arrangement 38a in which the deflection of the deflection masses 78a is only in the axial direction running approximately in the same direction as the axis of rotation A, since an axial only deflection does not require three-dimensional curvature of the deflection paths 74a. Otherwise, the construction shown in FIG. 4 substantially corresponds to the configuration shown in FIG. 3.

Figure 5:
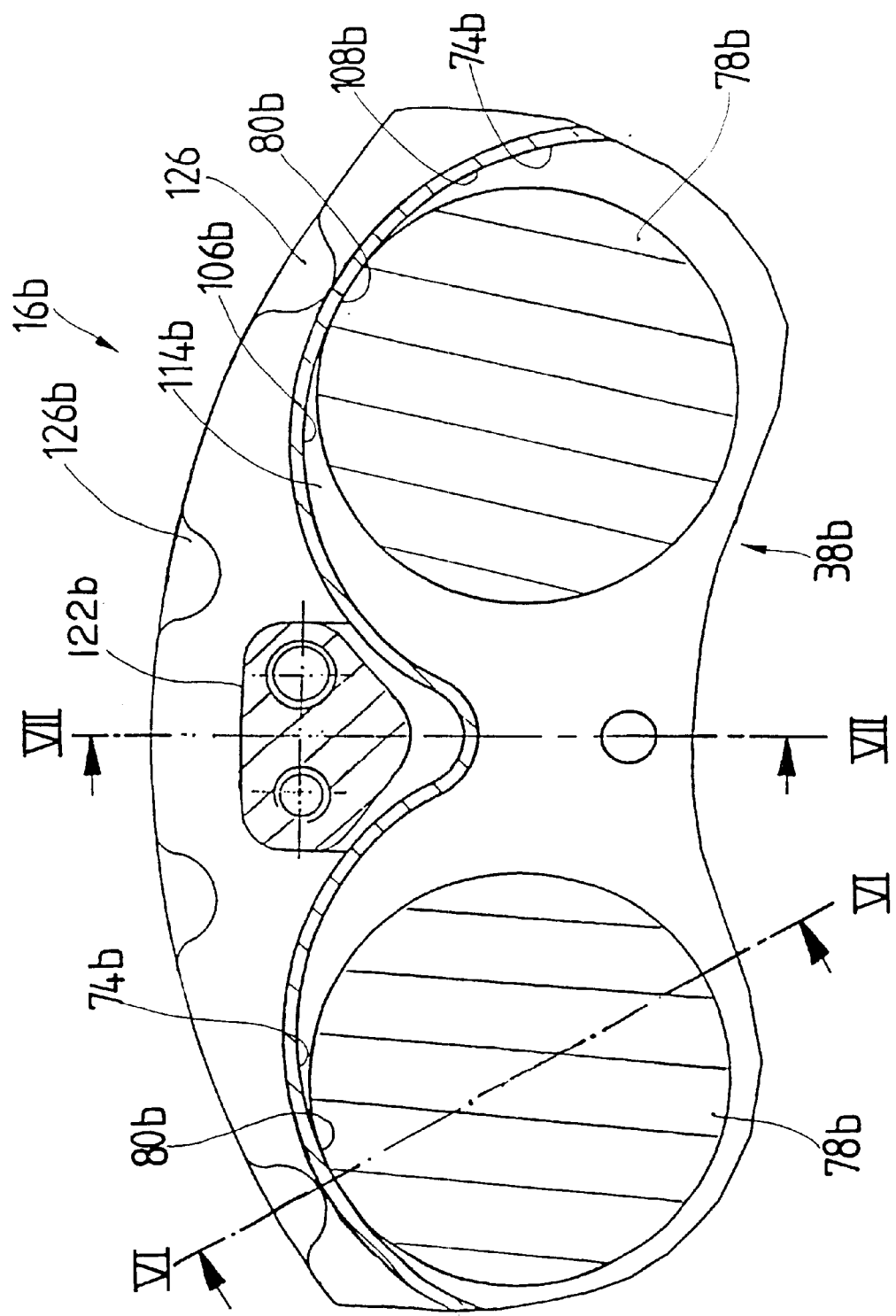
FIG. 5 is a partial axial sectional view of another embodiment of a vibration damping system according to the present invention in section along line V—V in FIG. 6.
Figure 7:
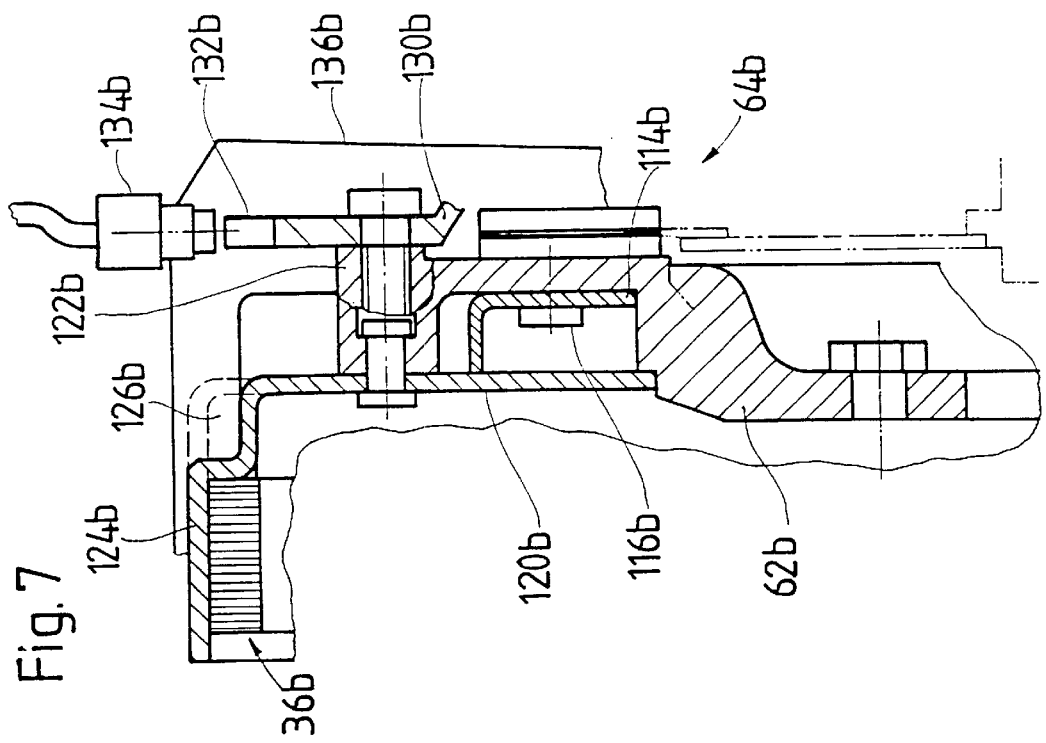
FIG. 7 is a longitudinal sectional view of the vibration damping system of FIG. 5 along line VII—VII in FIG. 5.
Figure 6:
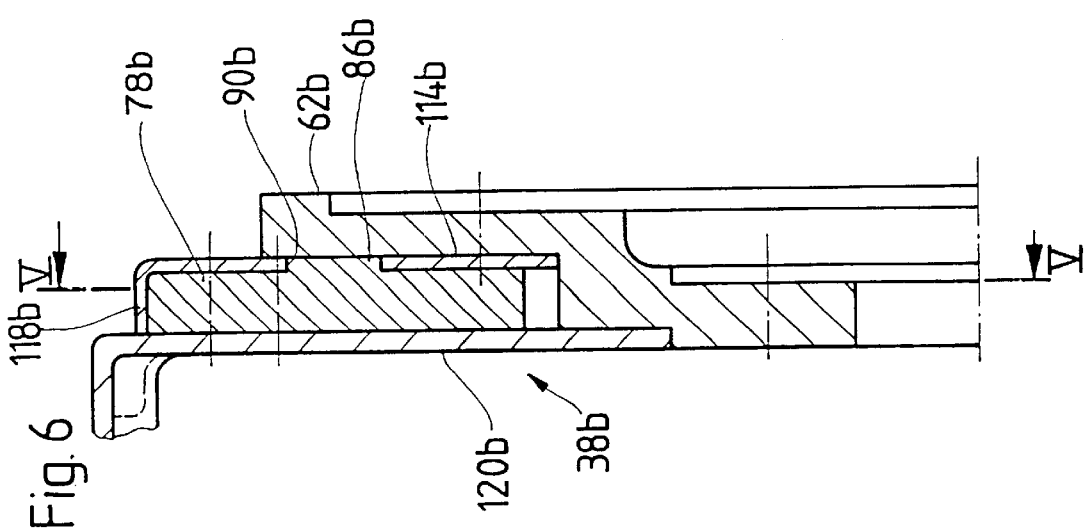
FIG. 6 is a longitudinal sectional view of the vibration damping system of FIG. 5 along line VI—VI in FIG. 5.

Another embodiment according to the present invention is shown in FIGS. 5 to 7, in which components which correspond to those described above with respect to construction and operation are designated by the same reference numbers with a suffix "b". Essentially only the area of the deflection mass arrangement 38b of this embodiment is shown. The electric machine, as discussed above, comprises a stator and a rotor and may, for example, comprise the embodiment of the electric machine 32 as shown in FIG. 2.

According to this embodiment, the deflection path arrangement 38b includes a path element 114b secured to a flywheel 62b, for example, by a plurality of screw bolts or rivets 116b. The path element 114b is shaped from a sheet metal blank, for example, by deep drawing and has an area 118b at a radial outer area of the path element 114b that is bent in the axial direction. An inner circumferential surface of the area 118b forms the deflection paths 74b for the deflection masses 78b which follow one another in the circumferential direction. The deflection paths 74b again have vertex areas 80b and deflection areas 106a, 108a which proceed from these vertex areas 80b in opposing circumferential directions. The individual deflection masses 78b are disk-shaped and are held axially between the path element 114b and a cover element 120b which is likewise connected with the flywheel 62b. As shown in FIGS. 5 and 7, the cover element 120b is secured to an axial shoulder 122b located between two deflection path areas 74b by corresponding bolts or rivets. A radial outer area of the cover element 120b is bent axially and there forms an annular carrier 124b for the rotor 36b.

FIG. 6 shows that the deflection masses 78b have, at least at one axial side, a guide projection 86b guided in a corresponding guide path 90b of the path element 114b. Of course, a corresponding configuration could be provided at the other axial side in the area of the cover element 120b. In addition, the transitional area of the cover element 120b leading to the axially extending portion 124b comprises shaped portions or impressions 126b which are distributed in the circumferential direction. The impressions 126b stiffen the cover element 120b and also form an axial contact surface for the rotor 36b. It is noted that the path element 114b may also have axial projections in its area 118b for engaging corresponding recesses of the cover element 120b. Furthermore, the axial projections of the path element 114b may be secured in that location by rolling or other connection. Accordingly, the radially outer side of the cover element 120b may also be secured. FIG. 7 shows that a clutch housing 130b of the friction clutch 64b may optionally be lengthened in the radial direction over the radial outer side of the flywheel 62b. Furthermore, a toothing 132b may be located on the cluth housing 130b opposite a magnetic pickup 134b secured to a transmission housing 136b. This configuration allows detection of both the rotational speed of the internal combustion engine and the rotational position of the crankshaft via a special tooth design.

Figure 8:
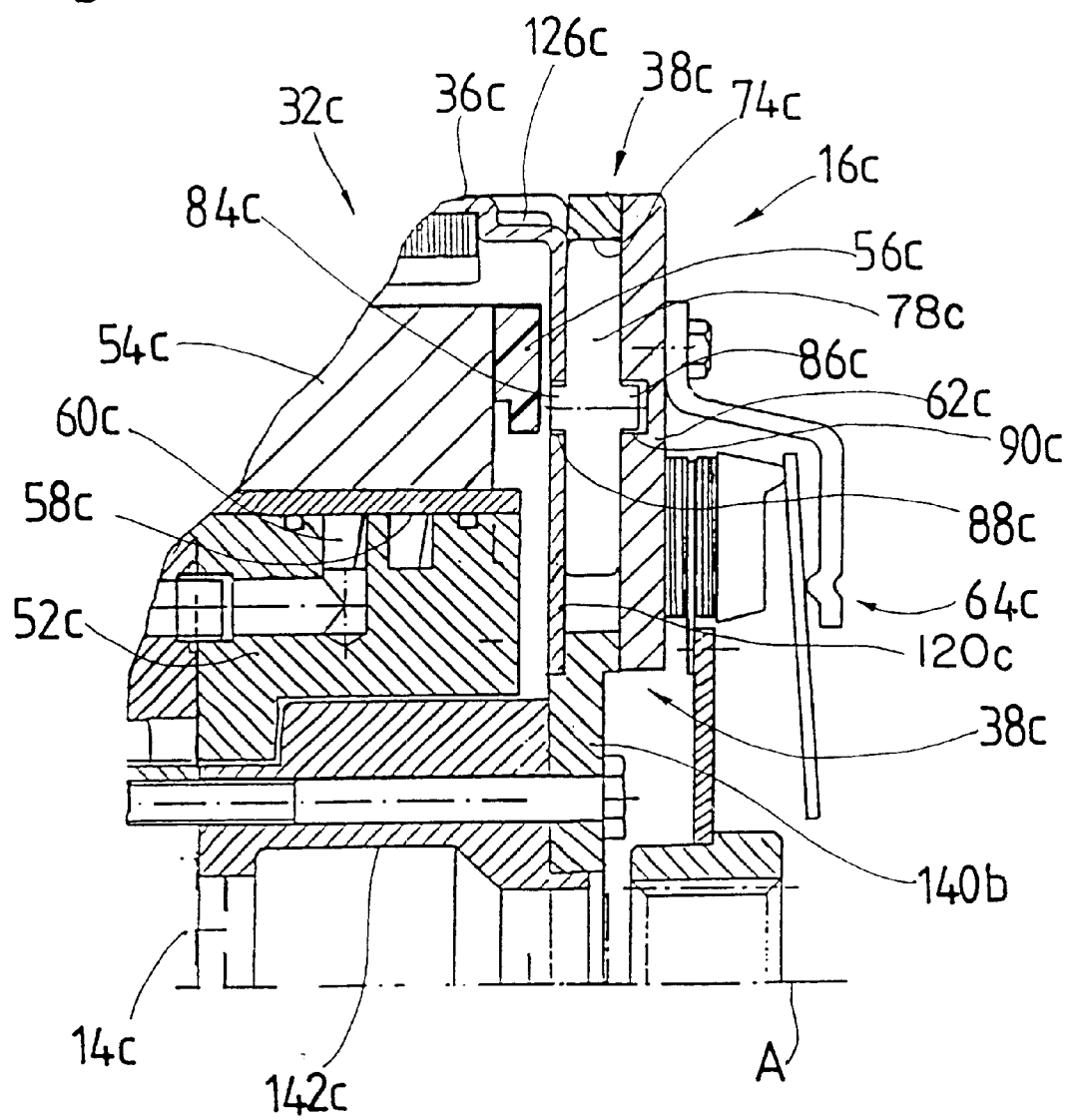
FIG. 8 is a partial longitudinal sectional view of yet another embodiment of a vibration damping system according to the present invention.

Another embodiment of a vibration damping system 16c according to the invention is shown in FIG. 8. Components which correspond to those described above with respect to construction and operation are designated by the same reference numbers with a suffix "c".

In the embodiment shown in FIG. 8, the electric machine 32c and the deflection mass arrangement 38c are arranged so that they are staggered in the axial direction such as in the embodiment according to FIGS. 5 through 7. The deflection mass arrangement 38c again has the cover element 120c carrying the rotor 36c and axially limiting one axial side of the deflection mass 78c. Axial limiting of the other side of the deflection masses 78c is provided by the flywheel 62c itself. Guide paths 90c, 88c which receive the corresponding guide projections 86c, 84c of the deflection masses 78c are respectively arranged in the flywheel 62c and in the cover element 120c. Since the deflection paths 74b and 74c of the embodiments of FIGS. 5 through 8 are at a greater radial distance from the axis of rotation A than the deflection path 74, 74a of the embodiments in FIGS. 2 to 4, deflection masses 78b, 78c may comprise shorter axial dimensions so that a compact axial type of construction may be retained in the axial offsetting of the electric machine 32c and deflection mass arrangement 38c.

Referring again to FIG. 8, the deflection paths 74c are formed at a central disk element 140c having the respective openings which follow one another in the circumferential direction and which form the deflection paths 74c. The cover element 120c is arranged at one axial side of the central disk element 140c and the flywheel 62c is arranged at the other axial side of the central disk element 140c. The central disk element 140c is then secured by screw bolts to the crankshaft 14c with the intermediary of a spacer ring 142c. The central disk element 140c may be produced from a sheet metal blank by stamping.

The preceding description with reference to FIGS. 2 to 8 was directed to embodiment forms of respective vibration damping systems all of which are capable of carrying out the function described in general above of damping or eliminating occurring vibrations in a drive system. It is noted that these vibrations may comprise torsional vibrations, wobbling oscillations, and/or possibly also radial oscillations. Regardless of the types of vibrations, suitable control of the electric machine ensures that the occurring vibrations are at least damped to the extent that the remaining vibrations may be damped by the deflection mass arrangement without a detuning of the individual oscillators caused by the collision or stopping of individual oscillating masses.

The tuning or adapting of the deflection mass arrangement to determined frequencies or orders of frequencies to be damped is carried out in general by suitable selection of the mass moment of inertia or angular momentum of the respective deflection masses, the quantity of deflection masses succeeding one another in the circumferential direction, and the configuration of the deflection paths associated with the deflection masses. To damp different frequencies or excitations simultaneously with a deflection mass arrangement of the type mentioned above, different deflection masses may have different parameters. That is, deflection masses having different mass, different mass distribution or differently configured deflection paths associated therewith may be provided to damp various different excitation frequencies.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A vibration damping system for motor vehicle drive system, comprising:
   a rotatable constructional group rotatable about an axis of rotation;
   an electric machine operatively connected to said rotatable constructional group for exerting a counter-torque on said rotatable constructional group;
   a control device operatively connected to said electric machine for controlling said counter-torque exerted on said rotatable constructional group; and
   a deflection mass arrangement operatively arranged in said rotatable constructional group and comprising at least one deflection mass and a deflection path associated with the at least one deflection mass and along which the at least one deflection mass is movable, said deflection path comprising a vertex area and deflection areas proceeding from said vertex area, wherein said vertex area comprises an area of said deflection path that is a greatest radial distance from the axis of rotation.

2. The vibration damping system of claim 1, wherein said control device is operatively connectable for receiving information about one of anticipated movement irregularities and occurring movement irregularities during rotation of the constructional group and said control device is operatively connected to said electric machine for controlling said electric machine so that said counter-torque counters the one of anticipated movement irregularities and occurring movement irregularities.

3. The vibration damping system according to claim 2, wherein said control device is operable for controlling said counter-torque at low rotational speeds of the rotatable constructional group, wherein said low rotational speeds include speeds less than 1800 revolutions/minute.

4. The vibration damping system of claim 2, wherein said control device controls said counter-torque for one of predetermined frequencies, predetermined frequency ranges and a predetermined type of movement irregularity independent from the rotational speed of said rotatable constructional group.

5. The vibration damping system of claim 2, wherein said electric machine generates a driving torque for supplying power to electric loads and said counter-torque is superimposed on said driving torque.

6. The vibration damping system of claim 1, wherein said deflection path of said at least one deflection mass comprises deflection areas extending along an axial direction proceeding from said vertex area.

7. The vibration damping system of claim 1, wherein said deflection path of said at least one deflection mass comprises deflection areas extending along the circumferential direction proceeding from said vertex area.

8. The vibration damping system of claim 7, wherein said deflection path of said at least one deflection mass comprises deflection areas extending along the axial direction proceeding from said vertex area.

9. The vibration damping system of claim 1, wherein said electric machine comprises a rotor connected to said rotatable constructional group for rotating with said rotatable constructional group and a stator which does not rotate with the rotatable constructional group, said stator being interactable with the rotor for generating said counter-torque.

10. The vibration damping system of claim 1, wherein said electric machine comprises one of a synchronous motor, an asynchronous motor, and a reluctance motor.

11. The vibration damping system of claim 1, wherein said deflection mass arrangement is arranged in an annular space at least partially radially inside said electric machine.

12. The vibration damping system of claim 1, wherein said deflection mass arrangement and said electric machine at least partially overlap in the axial direction.

13. The vibration damping system of claim 7, wherein said stator is arranged radially between said rotor and said deflection mass arrangement.

14. The vibration damping system of claim 7, wherein said stator is arranged radially outside of said rotor and said deflection mass arrangement.

15. The vibration damping system of claim 1, wherein said electric machine and said deflection mass arrangement are arranged in axial succession.

16. The vibration damping system of claim 1, wherein said deflection mass arrangement comprises a maximum damping capability and said electric machine is controlled by said control device for partial elimination of the movement irregularities so that a remaining portion of the movement irregularities have an amplitude that is within the maximum damping capability of said deflection mass arrangement.

17. A drive system for a motor vehicle, comprising:
   a drive unit;
   a rotatable constructional group rotatable about an axis of rotation connected with said drive unit;
   a vibration damping system comprising a deflection mass arrangement, an electric machine and a controller, wherein said deflection mass arrangement is arranged in said rotatable constructional group and comprises at least one deflection mass and a deflection path associated with the at least one deflection mass and along which the at least one deflection mass is movable, said deflection path comprising a vertex area and deflection areas proceeding from said vertex area, wherein said vertex area comprises an area of said deflection path that is a greatest radial distance from the axis of rotation, said electric machine is operatively connected to said rotatable constructional group for exerting a counter-torque on said rotatable constructional group, and said controller is operatively connected to said electric machine for controlling said counter-torque exerted on said rotatable constructional group.

18. The drive system of claim 17, wherein said drive unit comprises an internal combustion engine and said electric machine comprises a starter arrangement for said internal combustion engine.

19. The drive system of claim 17, wherein said electric machine comprises a generator arrangement.

20. The drive system of claim 17, wherein said deflection mass arrangement is arranged in an area of said rotating constructional group connected with said drive unit so that said deflection mass arrangement is fixed with respect to rotation relative to said rotating constructional group.

21. The drive system according to claim 20, further comprising a friction clutch having a flywheel, said deflection mass arrangement being arranged in an area of said flywheel of said friction clutch.

22. A method for vibration damping in a drive system having a drive unit and a rotating constructional unit connected with the drive unit using a vibration damping system comprising an electric machine and a deflection mass arrangement, said method comprising the following steps:

(a) detecting information indicating the occurrence of movement irregularities;

(b) controlling the electric machine such that it generates a counter-torque opposing the movement irregularities indicated in said step (a) and reducing the movement irregularities by the counter-torque generated by the electric machine; and (c) damping any movement irregularities remaining after said step (b) using the deflection mass arrangement.

* * * * *